US012654405B2

(12) United States Patent
Seminel et al.

(10) Patent No.: US 12,654,405 B2
(45) Date of Patent: *Jun. 16, 2026

(54) MULTI-LAYER BRAIDED ARTICLE

(71) Applicant: Ratier-Figeac SAS, Figeac (FR)

(72) Inventors: Bruno Seminel, Figeac (FR); Pascal Amat, Figeac (FR); Arnaud Andrzejewski, Lissac et Mouret (FR)

(73) Assignee: RATIER-FIGEAC SAS, Figeac (FR)

( * ) Notice: Subject to any disclaimer, the term of this patent is extended or adjusted under 35 U.S.C. 154(b) by 275 days.

This patent is subject to a terminal disclaimer.

(21) Appl. No.: 18/415,987

(22) Filed: Jan. 18, 2024

(65) Prior Publication Data

US 2024/0150009 A1 May 9, 2024

Related U.S. Application Data

(62) Division of application No. 17/307,014, filed on May 4, 2021, now Pat. No. 11,884,378.

(30) Foreign Application Priority Data

May 5, 2020 (FR) ...................................... 2004396

(51) Int. Cl.
D02G 3/28 (2006.01)
B29C 70/30 (2006.01)
(Continued)

(52) U.S. Cl.
CPC ................ B29C 70/30 (2013.01); D04C 1/06 (2013.01); *B29C 70/222* (2013.01); *B29C 70/24* (2013.01); *B64C 11/26* (2013.01); *D10B 2505/12* (2013.01)

(58) Field of Classification Search
CPC ................ D02G 3/286; B29L 2031/08; B32B 2305/184; D04C 1/06
See application file for complete search history.

(56) References Cited

U.S. PATENT DOCUMENTS 2,182,812 A 12/1939 Lougheed
4,019,940 A * 4/1977 Hood ........................ D07B 1/04
87/8

(Continued)

FOREIGN PATENT DOCUMENTS

DE 4005772 A1 9/1991
DE 102010008319 A1 8/2011
(Continued)

OTHER PUBLICATIONS

Abstract of DE4005772A1, 2 pages.
(Continued)

*Primary Examiner* — Tajash D Patel
(74) *Attorney, Agent, or Firm* — CANTOR COLBURN LLP

(57) ABSTRACT

A multi-layer braided article and a method of making the multi-layer braided article. The multi-layer braided article includes a braid extending along a first axis, wherein the braid is folded over itself to form a first layer and a second layer; and a wrapper laid over the first layer of the braid and extending circumferentially around the first axis, wherein the wrapper defines an edge of the first layer about which the braid is folded. The multi-layer braided article may form part of a blade for an aircraft. A sleeve may be provided around a conical portion of the article to connect the article to something else, such as a propeller hub, where the multi-layer braided article is formed as part of a blade. The sleeve may provide a primary or secondary load path.

13 Claims, 9 Drawing Sheets

(51) Int. Cl.

| | |
|---|---|
| *D04C 1/06* | (2006.01) |
| *B29C 70/22* | (2006.01) |
| *B29C 70/24* | (2006.01) |
| *B64C 11/26* | (2006.01) |

(56) References Cited

U.S. PATENT DOCUMENTS

| | | | |
|---|---|---|---|
| 4,273,601 A | | 6/1981 | Weingart |
| 5,179,827 A | * | 1/1993 | Tinsley .................. D02G 3/286 |
| | | | 57/236 |
| 5,222,297 A | | 6/1993 | Graff et al. |
| 5,376,118 A | * | 12/1994 | Kaplan .................... A61F 2/08 |
| | | | 606/228 |
| 5,439,353 A | | 8/1995 | Cook et al. |
| 5,630,349 A | | 5/1997 | Farley |
| 6,676,080 B2 | | 1/2004 | Molette |
| 7,252,028 B2 | | 8/2007 | Bechtold et al. |
| 7,581,479 B2 | | 9/2009 | Gessler et al. |
| 8,608,436 B2 | | 12/2013 | Wines et al. |
| 9,410,434 B2 | | 8/2016 | Petellaz |
| 9,670,788 B2 | | 6/2017 | Hoyland et al. |
| 9,987,823 B2 | | 6/2018 | Eli Eli et al. |
| 10,029,779 B2 | | 7/2018 | Fong et al. |
| 10,577,939 B2 | | 3/2020 | Vetters et al. |
| 11,090,880 B2 | | 8/2021 | Amat |
| 11,884,378 B2 | * | 1/2024 | Seminel .................. B29C 70/22 |

| | | | |
|---|---|---|---|
| 2001/0021427 A1 | | 9/2001 | Cundiff et al. |
| 2002/0008177 A1 | | 1/2002 | Violette |
| 2005/0288775 A1 | * | 12/2005 | Dong ....................... D02G 3/12 |
| | | | 623/23.74 |
| 2013/0129507 A1 | | 5/2013 | Moselage, III |
| 2015/0110633 A1 | | 4/2015 | Nagle et al. |
| 2017/0355446 A1 | | 12/2017 | Andrzejewski |
| 2018/0128112 A1 | | 5/2018 | Amat |
| 2018/0319100 A1 | | 11/2018 | Amat |
| 2018/0334912 A1 | | 11/2018 | Le Meur et al. |
| 2019/0315075 A1 | | 10/2019 | Gill |
| 2021/0062661 A1 | | 3/2021 | Loos |
| 2021/0403142 A1 | | 12/2021 | Seminel et al. |

FOREIGN PATENT DOCUMENTS

| | | | | |
|---|---|---|---|---|
| DE | 102014109886 A1 | | 1/2016 | |
| EP | 0442092 A2 | | 8/1991 | |
| EP | 2345534 A1 | * | 7/2011 | ............. B32B 27/34 |
| EP | 3399085 A1 | | 11/2018 | |

OTHER PUBLICATIONS

Abstract of EP0442092A, 2 pages.
European Search Report for Application No. 21160072.1, mailed Aug. 13, 2021, 9 pages.

* cited by examiner

MULTI-LAYER BRAIDED ARTICLE

CROSS REFERENCE TO RELATED APPLICATION

This application is a division of U.S. application Ser. No. 17/307,014 filed May 4, 2021, which claims priority to French Patent Application No. 2004396 filed May 5, 2020, the entire contents of which are incorporated herein by reference.

TECHNICAL FIELD

The present disclosure relates to a multi-layer braided article and a method of making a multi-layer braided article. The multi-layer braided article may form part of a blade for an aircraft engine. The blade may have a conical portion that connects to a sleeve, where the sleeve may be used to connect the blade to a hub.

BACKGROUND

Fibre composites, also known as fibre-reinforced composites (FRCs) are traditionally made from high-strength fibres that are woven, knitted, or braided into a shape and the shape is then fixed in that configuration by a resin. These composite materials often have very high strength-to-weight ratios compared to many metals. Fibre composites often have greater corrosion resistance than many metals. This makes fibre composites attractive in many industries and they are particularly suited to parts used in vehicle manufacturing such as aerospace.

A known weakness of many fibre composites is delamination. A fibre composite may have very high tensile modulus and high breaking strength along each fibre direction but may have a very low modulus and low breaking strength in directions transverse to the fibre directions. For example, a composite made of multiple layers of plain woven fabric stacked in the z-direction may have great tensile strength in the warp (x-direction) and weft (y-direction) axes of the fabric layers, but the layers may be relatively easily pulled apart by tension in the z-direction.

U.S. Pat. No. 7,252,028 discloses a method and device for braiding a rigid core with a braided structure of heavy duty fibres. The braided structure may be formed from multiple layers of braided material. These multiple layers may be formed by passing the core through the braiding ring in a first direction, to form the first braid layer, and then reversing the direction of motion of the core to form the second braid layer on top of the first braid layer. It is necessary to secure the first braid layer before reversing the direction of motion, or else the first braid layer will lose tension and start to come undone when starting to braid the second layer. U.S. Pat. No. 7,252,028 discloses a device for securing the first layer while the second layer is begun. Braids are self-stabilizing after they have been formed to an initial length. To form this initial length of the second layer without losing tension or undoing the first layer, in U.S. Pat. No. 7,252,028, a first braid layer is formed around a core moving in the first direction through a braiding machine. A multi-part shell connected to a clamping device is clamped around the first braid layer. The direction of motion of the core through the braiding machine is then reversed and the second layer of braid starts to form over the shell. The edge of the multi-part shell determines a fold line where the first layer of braid folds over itself and becomes the second layer. After the second layer of braid has begun to form and has reached a self-stabilizing length, temporary pins/needles are inserted near the fold line to secure both braid layers in position while the shell is removed from between the braid layers. Thereafter, the temporary pins/needles are removed while the second layer of braid is braided further. The second layer is therefore continuous with the first layer because the braid fibres forming the first layer continue into the second layer without any cut in the fibres. The shell and temporary pins are removed during manufacture and do not form part of the finished article. Thus, the second layer lies in abutment with the first layer in the finished article.

The above process may be repeated to form a third layer of braid over the second layer etc. In this way, a multi-layer braided article may be formed.

EP 3399085 discloses an alternative method for securing the first layer of a braid while the second braid layer is begun. In EP 3399085, the first layer of a braid is braided along a core. At a furthest end of the first layer, one or more blind stitches is sewn into the first layer to secure it to another fabric/braid layer underneath. The direction of braiding is then continued in the reverse direction. The blind stitches maintain tension in the first layer and they provide an edge around which the braid folds over itself to start forming the second layer. After braiding the second layer for a distance, a second set of blind stitches may be stitched into the second layer, stitching it to the first layer. At this point, the direction of braiding may again be reversed (i.e. so that it now continues in the same braiding direction as the initial first layer) and the second set of blind stitches provides an edge around which the braid folds over itself to start forming the third layer. Multiple layers, all formed from a single braid (i.e. made by a single braiding machine and without cutting of the fibres at the end of each layer), may thus be laid up with this method to create a 3D braided article.

U.S. Pat. No. 6,676,080 B2 discloses an aircraft blade having a metallic outer ring that forms a root portion of the blade for connecting the blade to a hub. Fibres of the blade body gradually curve around the outer surface of a metallic inner ring having a generally teardrop shaped cross-section, to form a flared portion at the base of the blade.

SUMMARY

In a first aspect, there is provided a multi-layer braided article comprising a braid extending along a first axis, wherein the braid is folded over itself to form a first layer and a second layer; and a wrapper laid over the braid and extending circumferentially around the first axis, wherein the wrapper defines an edge of the first layer about which the braid is folded.

The wrapper may be formed from one or more tows of fibres wrapped around the braid. For example, the tows may be unidirectional tows, in which all tows are wrapped around the braid such that the tow or tows all lie parallel to each other. Alternatively, the wrapper may be formed from a piece of fabric wrapped around the braid. In either case, the tow or strip of fabric does not penetrate the braid. That is, the wrapper does not penetrate the braid. By extending around the circumference, the wrapper can clamp that layer of braid in place by hoop tension. This may maintain tension in the first layer. By contrast, stitches (e.g. blind stitches) must penetrate the braid, e.g. as in EP 3399085.

The wrapper may comprise one or more unidirectional tows wrapped circumferentially around the first layer and/or the wrapper may comprises a fabric wrapped circumferentially around the first layer. The tows may be wrapped in a single layer or multiple layers around the first layer.

The wrapper may have a uniform thickness along its length or it may have a variable thickness. In one example, the wrapper is thicker near the edge about which the braid is folded. This may allow greater control of the thickness of the multi-layer article at desired locations along its length.

The wrapper may provide hoop tension around the first layer of braid to fix the edge in position along the first axis. This may maintain tension in the first layer of braid when the braiding direction is reversed.

The wrapper may be applied robotically during the braiding process, without requiring human intervention. Cutting of a braid typically requires human intervention.

The braid may be formed from high strength fibres suitable for aeronautical applications. For example, the fibres may be one or more of: carbon fibre, glass fibre, an aramid, or a mixture thereof.

The braid may be a uniaxial, bi-axial, tri-axial or interlock braid. In some non-limiting examples, the braid may be a (0, ±45°) braid, a (±45°) braid, or a (20°, 30°, 70°) braid.

The multi-layer braided article may be produced by being braided around a core and the core may optionally form part of the finished article. In other examples, the core may be removed after forming the multi-layer braided article. The first layer of the multi-layer braided article may be in direct contact with a core around which the braid is formed. Alternatively, one or more intervening layers, e.g. other layers of braided or fabric material, may overlay the core and form further part(s) of the multi-layer braided article.

Through-thickness reinforcement may be used, penetrating at least two braid layers of the multi-layer braided article at a location other than an edge about which the braid folds over itself. For example, reinforcement stitches, optionally blind stitches, tufting, or peening may be used. The through-thickness reinforcement may be configured to provide delamination resistance for the multi-layer braided article.

Multiple braids may be laid, one on top of the other, to produce a thicker multi-layer braided article.

Thus in an embodiment, the edge of the first layer may be a first edge and the wrapper may be a first wrapper, wherein the first wrapper extends a first axial length from the first edge. The multi-layer braided article may further comprise: a second braid on top of the first braid and extending along the first axis, wherein the second braid is folded over itself to form a first layer and a second layer. The article may further comprise a second wrapper laid over the first layer of the second braid and extending circumferentially around the second braid; wherein the second wrapper defines a second edge, that is located at the same axial location as the first edge, about which the second braid is folded. The second wrapper may extend a second axial length that is less than the first axial length; and wherein the first layer of the second braid extends from the second edge by a length that is greater than the first axial length, such that the first and second braids form a conical portion of the multi-layer braided article.

The wrapper therefore has an axial extent between its two ends. For each wrapper, one end of the wrapper defines the edge around which the respective braid folds. It will therefore be appreciated that where it is stated above that the first wrapper extends a first axial length from the first edge, this first edge is the edge defined by the end of the wrapper about which the braid folds. In other words, the first wrapper extends a first axial length from an end of the wrapper about which the braid folds. Similarly, where it is stated above that the second wrapper defines a second edge and may extend a second axial length this second edge is the edge defined by the end of the wrapper about which the second braid folds.

The first braid is folded over itself and thus makes up first and second layers. The second braid, laid over the first braid and folded over itself in the same manner as the first braid, thus make up third and fourth layers.

A plug may be inserted into a central aperture of the conical portion.

Through-thickness reinforcement may be applied in the second layer of the first braid, or in any subsequent layer of braid, to secure the second, or subsequent, layer to a layer of braid beneath. Examples of through-thickness reinforcement may include any of stitching, tufting, or peening.

The through-thickness reinforcement may form an edge around which the braid is folded to form a further layer of the braid on top of the second, or subsequent, layer.

In another aspect, there is provided an aircraft blade comprising: the aforementioned multi-layer braided article according to any aspect or embodiment described above, wherein the braids have been impregnated with resin and cured to make a fibre-reinforced composite multi-layer braided article. In an embodiment in which the first and second braids form a conical portion of the multi-layer braided article, the blade may further comprise a sleeve having an inner diameter, wherein the sleeve extends around the fibre-reinforced composite multi-layer braided article and abuts the conical portion. The inner diameter may be smaller than an outer diameter of the conical portion such that the sleeve cannot move along the fibre-reinforced-composite multi-layer braided article past the conical portion.

In another aspect, there is provided a propeller comprising: a hub; and a plurality of aircraft blades connected to the hub, wherein each aircraft blade is an aircraft blade according to any embodiment described above. In an embodiment in which each aircraft blade comprises a sleeve, the sleeve of each aircraft blade may be a metallic sleeve that forms part of the connection between the hub and the respective multi-layer braided article. The abutment of the sleeve against the conical portion provides a connection between the sleeve and blade that does not require screws, bolts, or adhesives to connect the sleeve to the blade. Adhesive may optionally be used to reinforce the connection between the sleeve and the blade. In some known designs, a multi-layer braided article formed into a blade is formed around a metallic tulip that connects the braided part of the blade to the hub. By contrast, in this aspect, the metallic sleeve that connects the braided part of the blade to the hub is located radially outside the braided part of the blade.

In another aspect, there is provided a method of making a multi-layer braided article, the method comprising the steps of: braiding a first braided layer over a core by braiding in a first axial direction along the core; wrapping a wrapper circumferentially around the first braided layer to define an edge of the first braided layer; and continuing the braiding in a second direction, opposite the first direction, along the core to form a second braided layer over the first layer; wherein the wrapper maintains tension in the first layer during the braiding in the second direction.

The braid of this aspect may be in direct abutment with the core or there may be intervening layers, for example, intervening layers of braid, formed beneath the braid of this aspect. Such intervening layers of braid may include a wrapper too or, alternatively, may end (i.e. be cut) such that they are single layers (i.e. not folded over themselves).

It will be appreciated that the first and second braided layers are therefore layers of a first braid. In the method, by continuing the braiding in a second direction opposite to the first direction, it will be appreciated that in the finished article, the first braid is folded over itself to form the first and second braided layers.

The wrapper may be a first wrapper, wherein the edge of the first layer is a first edge, wherein the first wrapper extends a first axial length along the core from the first edge, and wherein the first and second layers are, respectively, first and second layers of a first braid. The method may then comprise: braiding, in the first axial direction, a first layer of a second braid on top of the first braid, such that the first layer of the second braid extends for an axial distance greater than the first axial length. The method may further comprise wrapping a second wrapper circumferentially around the first layer of the second braid to define a second edge, wherein the second edge is at the same axial location along the core as the first edge. The second wrapper may extend a second axial distance along the core and wherein the second axial distance is less than the first axial distance and the method may further comprise continuing the braiding of the second braid in the second axial direction to form a second layer of the second braid over the first layer of the second braid; wherein the second wrapper maintains tension in the first layer of the second braid during the braiding in the second axial direction, wherein the first and second braids form a conical portion of the multi-layer braided article.

The method may comprise: braiding one or more further braids, in sequence, on top of the first and second braids, each further braid comprising: a first and second layer and a wrapper defining an edge of that braid's first layer; wherein the edges of all of the braids' first layers are at the same axial position along the core. The wrapper of each further braid may extend for a shorter axial length than the axial length of any of the wrappers located beneath that further braid, such that the plurality of braids form a conical portion of the multi-layer braided article.

In another aspect, there is provided a method of making a propeller blade, the method comprising the steps of: performing the method of making a multi-layer braided article as described above, so as to make the multi-layer braided article having a conical portion and a blade portion. The method further comprises, in any order, the steps of forming a fibre-reinforced composite multi-layer braided article from the multi-layer braided article; and placing a sleeve around the multilayer braided article, wherein the metallic sleeve has a conical portion that abuts the conical portion of the multi-layer braided article such that the conical portion prevents axial movement of the metallic sleeve past the conical portion, so as to form the propeller blade. Optionally the method may comprise removing the core and optionally inserting a plug into an aperture of the conical portion, either before or after the step of forming a fibre-reinforced composite.

During braiding, the multi-layer braided article is braided around a core that may be a prepreg (a fibrous material pre-impregnated with a particular synthetic resin), a spar foam, a metal, or other suitable material. The core is to provide support for the braid during construction.

In some applications it may be desirable to remove the core after forming the multi-layer braided article.

In other applications it may be desirable to keep the core within the multi-layer braided article after forming the article; for example the core may provide strength to a finished blade made using the multi-layer braided article.

After braiding the multi-layer braided article, it may be desired to form it into a fibre-reinforced composite multi-layer braided article. Thermoset resin may be injected into the multi-layer braided article and then heated to set the resin. This is known as Thermoset Resin Injection®. Alternatively, fibres forming the multi-layer braided article may be powdered with a thermoplastic resin and then the resultant article could be cured. Various methods are known in the art for forming a given woven or braided article into a fibre-reinforced composite article.

DESCRIPTION OF THE FIGURES

Certain embodiments of the present disclosure will now be described in greater detail by way of example only and with reference to the accompanying drawings in which.

DETAILED DESCRIPTION

Figure 1:
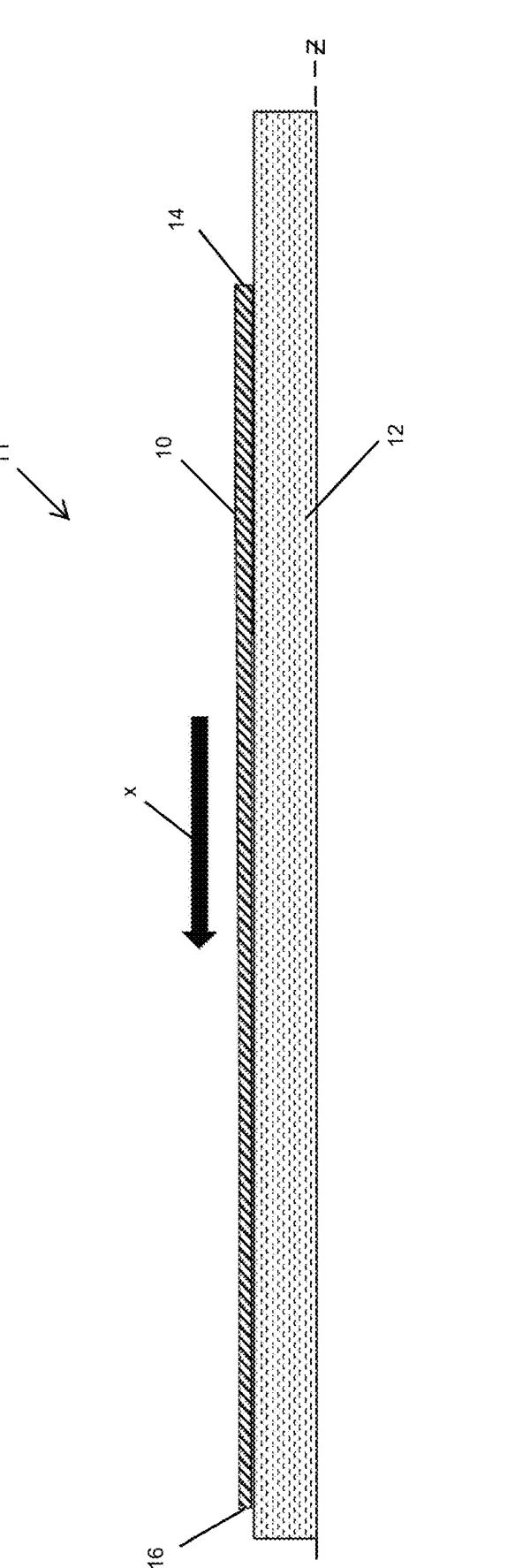
FIG. 1 shows a cross-section of a first layer of braid braided around a core.

FIG. 1 shows a cross-section of a braid 11 formed over a core 12. The braid 11 extends circumferentially around the core 12. For simplicity, in FIGS. 1-5, only the upper half of the core 12 and braid 11 is shown and axis Z is the central axis of the core 12.

The braid 11 begins at a first end 14 and is braided around the core 12 in a first direction X, depicted by an arrow, which is directed along an axis of the core 12. The braiding continues to a second end 16 such that a first layer 10 of the braid 11 has been braided around the core 12.

Figure 2:
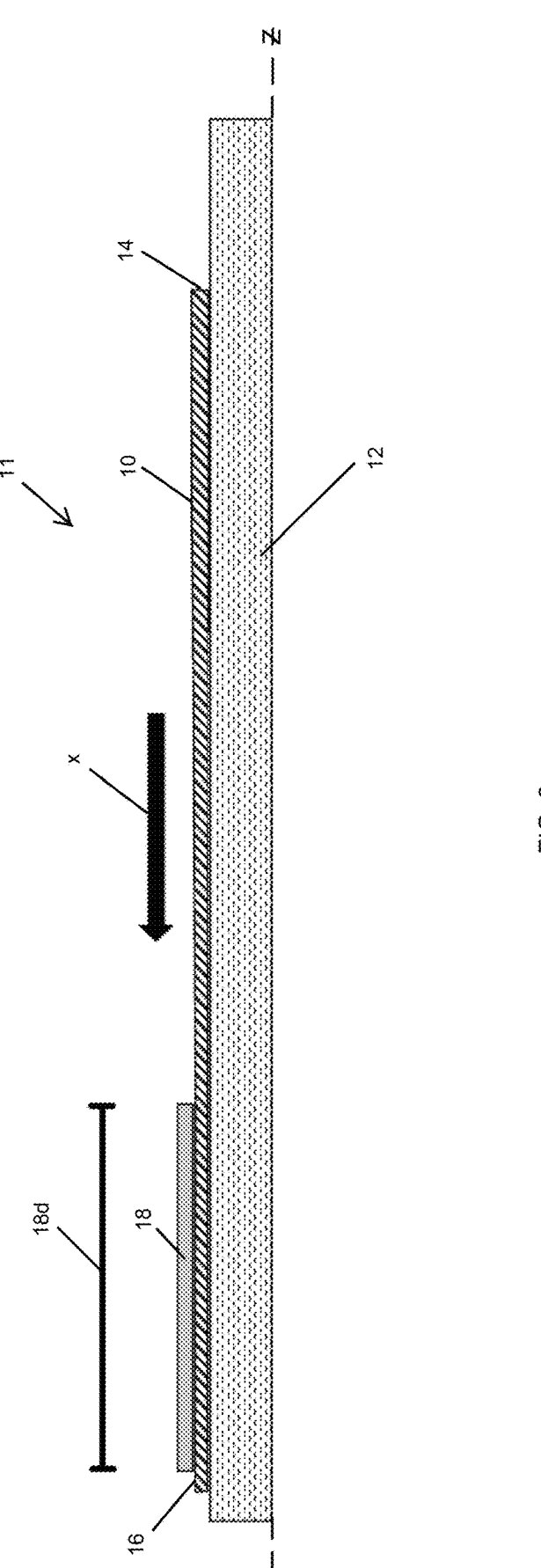
FIG. 2 shows a wrapper applied over the first layer of braid.

As shown in FIG. 2, a wrapper 18 is then wrapped circumferentially around the first layer 10 of the braid 11. The wrapper 18 extends from a point adjacent the second end 16 (edge 18a as discussed below, which may also be considered as an end 18a of the wrapper) and extends towards the first end 14 by a length 18d (to end 18b of the wrapper as discussed below). The wrapper 18 may be formed from one or more tows of fibre wrapped around the first layer 10. Alternatively or additionally, the wrapper 18 may comprise a piece of fabric wrapped around the first layer 10. The fibres used for the tows or for the fabric may be the same as or different from the fibres used in the braid 11. The wrapper 18 may be formed of more than one layer of tows and/or fabric. The wrapper 18 remains in place in the finished article.

Figure 3:
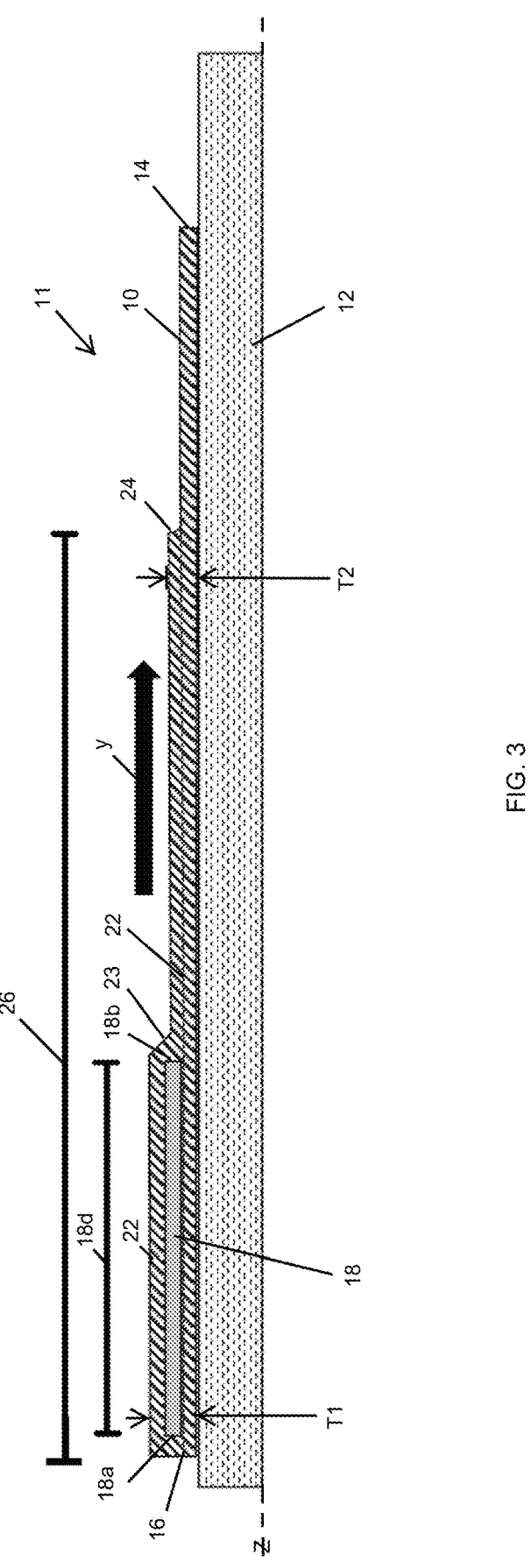
FIG. 3 shows a second layer of the braid braided around the wrapper and back over the first braided layer.

As shown in FIG. 3, the braiding direction is then reversed such that the braiding of the braid 11 continues in the opposite direction Y, depicted by an arrow. The wrapper 18 ensures that the braid tension in the first layer 10 is not lost when the direction of braiding is reversed. The end of the wrapper 18 nearest to the second end 16 forms an edge 18a around which the braid 11 folds. The braiding continues in the direction Y to form a second layer 22 of the braid 11. The braid fibres are not cut at the second end 16, but they are continuous around the edge 18a formed by the wrapper 18 and remain continuous up to the end 24 of the second layer 22. The reversal of the braiding direction may be effected by moving the core 12 in the opposite direction through a static braiding machine. Alternatively, the braiding machine may be moved in one direction (X) and then the opposite direction (Y) relative to a static core 12.

The second layer 22 extends a length 26 between the second end 16 of the first layer and the end 24 of the second layer. The length 26 of the second layer is greater than the length 18d of the wrapper 18. This means that the second layer 22 extends over the opposite end 18b of the wrapper 18, after which the second layer 22 lays directly against the first layer 10 of the braid 11. The end 24 may be secured to the first layer 10, for example, by blind stitches, stitching through the second layer 22 and into the first layer 10. Alternatively or additionally, the end 24 may be secured to the first layer 10 by adhesive. Indeed, any two adjacent layers of braid disclosed herein may optionally be secured together using blind stitches or adhesive. Blind stitching is a stitching technique using a curved needle that allows two layers to be stitched together even if there is no available access to one side of the two layers. In this disclosure, the inner side of the first layer abuts the core 12 and the core 12 therefore prevents ready access to this side of the two layers but this is not a problem when using blind stitches to connect the layers.

To function properly to define an edge of the braid, stitches (such as blind stitches) must extend into some form of underlayer beneath the braid, and the underlayer must be capable of receiving stitches. Thus, for example, the underlayer must be a fabric layer or a braid. In the present example, the wrapper is laid over the first layer 10 of the braid 11 and no underlayer is required here.

Braid ends are areas traditionally having reduced peel strength and reduced shear strength in braided composite articles. Avoiding having a given braid end by instead having a fold in the braid may improve the peel strength and shear strength of the finished article.

In the axial region containing the wrapper 18, the overall thickness (first thickness T1) in the radial direction, measured from the radially outer surface of the core 12, is determined by the thickness of the first layer 10, the thickness of the wrapper 18, and the thickness of the second layer 22. In the axial region between the wrapper end 18b and the end 24 of the second layer, the thickness (second thickness T2) is determined by the thickness of the first 10 and second 22 layers. This is smaller than the thickness T1 of the axial region containing the wrapper 18 and consequently there is a transition region 23 having a conical shape where the thickness of the article changes from the first thickness T1 to the second thickness T2.

In an example where the layers 10, 22 and wrapper 18 all have unit thickness, the thickness in the axial region of the wrapper is three units. In the axial region having just the first and second 10, 22 layers, the thickness is two units. In the axial region having just the first layer, the thickness is one unit. Of course, the layers 10, 22 and wrapper 18 do not necessarily have the same thickness as one another and this example is merely for explanatory purposes.

In FIG. 3, the end 24 of the second layer 22 is depicted as lying on top of the first layer 10. However, in another example (not shown), the braiding of the second layer 22 may continue such that the end 24 of the second layer extends past the first end 14 and thereafter abuts against the core 12. Put another way, the distance between the first end 14 and the second end 16 may be greater than the distance between the second end 16 and the end 24 of the second layer, or it may be less than said distance, or it may be equal to said distance. In the latter case, the end 24 is at the same axial location along the core 12 as the first end 14.

In the example shown in the Figures, the braid 11 is cut at the second end. However, in an alternative (not shown), the second layer 22 of the braid 11 may extend to an end, and another wrapper (e.g. similar to wrapper 18) may be wrapped around the second layer adjacent this end and, in the same manner as described above for the formation of the second layer, a third layer may be formed by reversing the braiding direction again (i.e. braiding in direction X again). Alternatively, blind stitches may be used at this location to secure the second layer 22 to the first layer.

Figure 4:
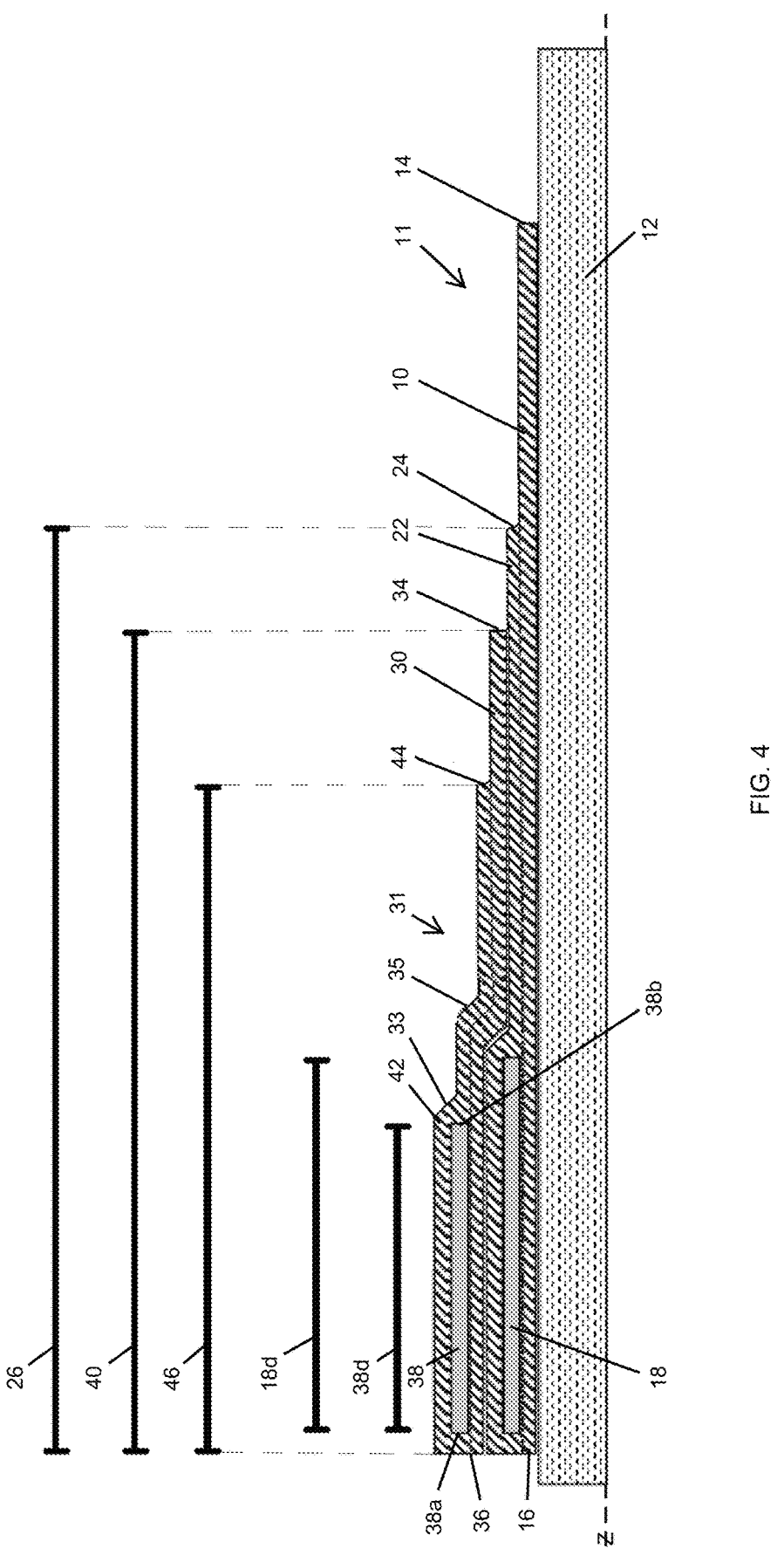
FIG. 4 shows a second braid braided over the first braid.

In FIG. 4, a second braid 31 is braided over the first braid 11 in much the same manner as described above for the first braid 11. That is, a first end 34 of the second braid 31 is laid down in abutment with, i.e. on top of, the second layer 22 of the first braid 11. The second braid 31 is then braided, in the first direction X, along the second layer 22 of the first braid 11, up to a second end 36 of the second braid 31. The second end 36 of the second braid 31 is analogous to the second end 16 of the first braid 11. The second end 36 of the second braid 31 and the second end 16 of the first braid 11 are located at the same axial position along the core. The first layer 30 of the second braid 31 extends a length 40 between the first and second 34, 36 ends. In the example shown, the length 40 of the first layer of the second braid is less than the length 26 of the second layer 22 of the first braid 11.

The braiding of the second braid 31 is paused and a second wrapper 38 is wrapped around the second braid 31. As with the first wrapper 18, the second wrapper 38 may be formed of one or more tows of fibres or may be formed from fabric. The first and second wrappers 18, 38 may be the same (i.e. both formed from tows of fibre or both formed from fabric) or may be different (e.g. one formed from one or more tows while the other is formed from fabric).

In the example shown in FIG. 4, the second wrapper 38 extends an axial length 38d between a first end 38a (that is adjacent the second end 36 of the second braid 31) and an opposite end 38b. The axial length 38d of the second wrapper 38 is less than the axial length 18d of the first wrapper 18.

The braiding direction of the second braid 31 is then reversed such that the braiding continues in the opposite direction, e.g. as depicted by arrow Y in FIG. 3. The wrapper 38 ensures that the braid tension in the first layer 30 is not lost when the direction of braiding is reversed. The end of the wrapper 38 nearest to the second end 36 forms an edge 38a around which the braid 31 folds. The braiding continues in the direction Y to form a second layer 42 of the second braid 31. The fibres of the second braid 31 are not cut at the second end 36, but they are continuous around the edge 38a formed by the wrapper 38 and remain continuous up to the second end 44 of the second layer 42. The second layer 42 extends a length 46 between the second end 36 of the first layer 30 and the second end 44 of the second layer 42. The length 46 of the second layer 42 is greater than the length 38d of the second wrapper 38. This means that the second layer 42 extends over the opposite end 38b of the second wrapper 38, after which the second layer 42 lays directly against the first layer 30 of the second braid 31.

Similar to the first braid 11, in the axial region containing the second wrapper 38, the overall wall-thickness in the radial direction of the second braid 31 is determined by the thickness of the first layer 30, the thickness of the wrapper 38, and the thickness of the second layer 42. This means that the overall wall-thickness of the article, at this stage of production, in the axial region containing the second wrapper 38 and measured from the surface of the core 12, is defined by the thicknesses of: the first layer 10 of the first braid, the first wrapper 18, the second layer 22 of the first braid, the first layer 30 of the second braid 31, the second wrapper 38, and the second layer 42 of the second braid 31.

In the axial region between the second wrapper end 38b and the second end 44 of the second layer 42, the thickness of the second braid 31 is determined by the thickness of the first 30 and second 42 layers. This is smaller than the thickness of the axial region containing the second wrapper 38 and consequently there is a first transition region 33 having a conical shape where the thickness of the second braid 31 changes from the first thickness to the second thickness.

In the second braid 31, there is also a second transition region 35 where the first and second 30, 42 layers extend over the transition region 23 of the first braid 11. The thickness of the second braid 31 does not substantially change at this second transition region 35. However, the wall-thickness of the overall article does decrease at this point. That is, in the axial region between the two transition regions 33, 35, the thickness of the overall braided article, measured from the surface of the core 12, is defined by: the first layer 10 of the first braid, the wrapper 18, the second layer 22 of the first braid, and the first and second 30, 42 layers of the second braid 31.

To elucidate this with a non-limiting example in which all braid layers 10, 22, 30, 42 and all wrappers 18, 38 have unit thickness, then, going from left to right in the orientation shown in FIG. 3:

in the axial region containing the second wrapper the wall-thickness is six units;

in the axial region between the two transition regions 33, 35 of the second layer, the wall-thickness is five units;

in the axial region between the second transition region 35 and the second end 44 of the second braid 31, the wall-thickness is four units;

in the axial region between the second end 44 of the second layer and the first end 34 of the second braid 31, the wall-thickness is three units;

in the axial region between the first end 34 of the second braid 31 and the second end 24 of the first braid 11, the wall-thickness is two units; and in the axial region between the second end 24 of the second layer 22 of the first braid 11 and the first end 14 of the first braid 11, the wall-thickness is one unit.

From this example, which is non-limiting and given purely for explanatory purposes, it is clear how building up braids 11, 31 etc., one over the other, develops a monotonically decreasing thickness in the overall wall-thickness from left to right in the orientation shown. In the limit where there are many overlaid braids and where each braid is thin in the radial direction, the aforesaid profile tends to a conical profile along part of the overall article.

Figure 5:
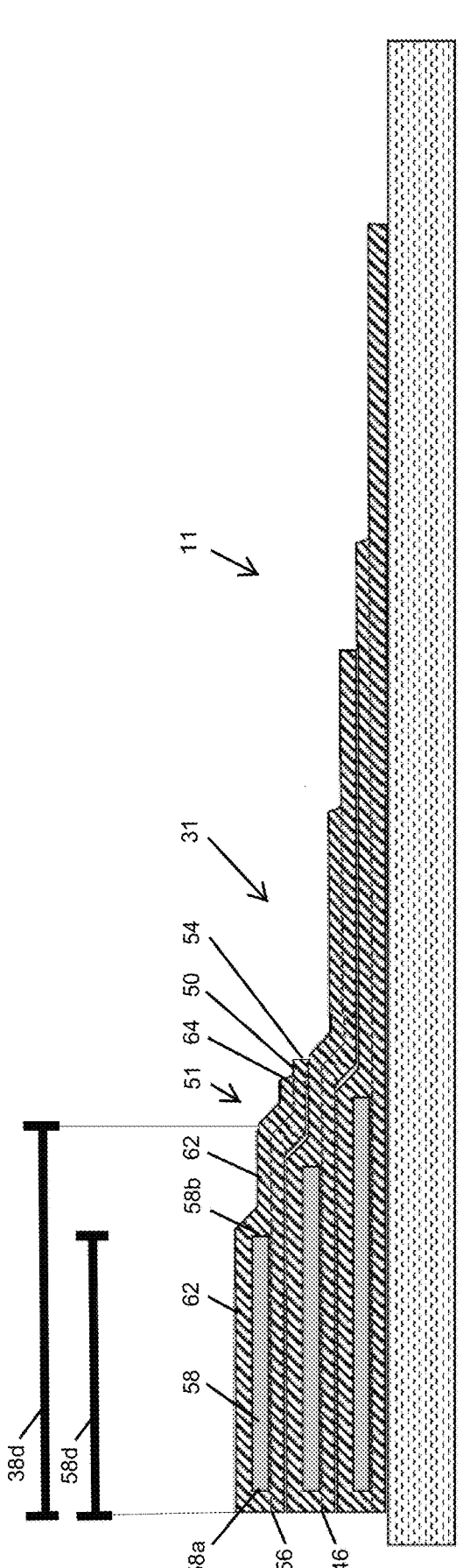
FIG. 5 shows a third braid, braided over the second and first braids.

FIG. 5 shows a third braid 51 that has been braided over the second braid 31 in the same manner as described above for the second braid 31 being braided over the first braid 11. As such a detailed description will be omitted and only some salient points described in detail.

A first end 54 of a first layer 50 of the third braid 51 has, in this example, been formed over the second braid 31 in the region between the two transition regions 33, 35. However, in alternative examples (not shown), the end 54 could instead be formed at a different location, either on the second braid 31 or on the first braid 11 or on the core 12, as desired.

The third braid 51 is braided in the first direction X and extends from the first end 54 to a second end 56 at which point a third wrapper 58 is wrapped around the third braid 51. The third wrapper 58, similar to the first and second wrappers 18, 38, may be fabric or one or more tows of fibres. The end of the wrapper forms an edge 58a around which the third braid 51 folds when the braiding direction is reversed. The end of the wrapper 58 is at the same axial location as the ends of the first and second 18, 38 wrappers. The third wrapper 58 extends an axial length 58d away from the first end 54. The axial length 58d for the third wrapper is less than the axial length 38d of the second wrapper 38. A second layer 62 of the third braid 51 is then braided in the opposite direction (direction Y) from the second end 56 of the first layer 50 to the end 64 of the second layer. In the example shown, the end 64 overlays the first layer 50 of the third braid 51. As may be seen in FIG. 5, the overall wall-thickness monotonically decreases when starting from the second end 56 in the second direction (direction Y).

The reader will appreciate that the lengths 18d,38d, 58d of the wrappers 18, 38, 58 may be different from those depicted. In the examples shown, the wrappers get monotonically shorter in each subsequent braid, going from innermost to outermost braid. However, the length of any given radially-outer wrapper may in some circumstances be greater than the length or the same length as a given radially-inner wrapper. The reader will appreciate that this increases the possible variety of shapes of the overall multi-layer braided article produced in this manner.

Similarly, in the examples shown, the lengths of subsequent layers get monotonically shorter in each subsequent layer, going from innermost layer to outermost layer. However, the length of any given radially outer layer may in some circumstances be greater that or the same as the length of a given radially-inner layer. The reader will appreciate that this increases the possible variety of shapes of the overall multi-layer braided article produced in this manner.

Figure 6A:
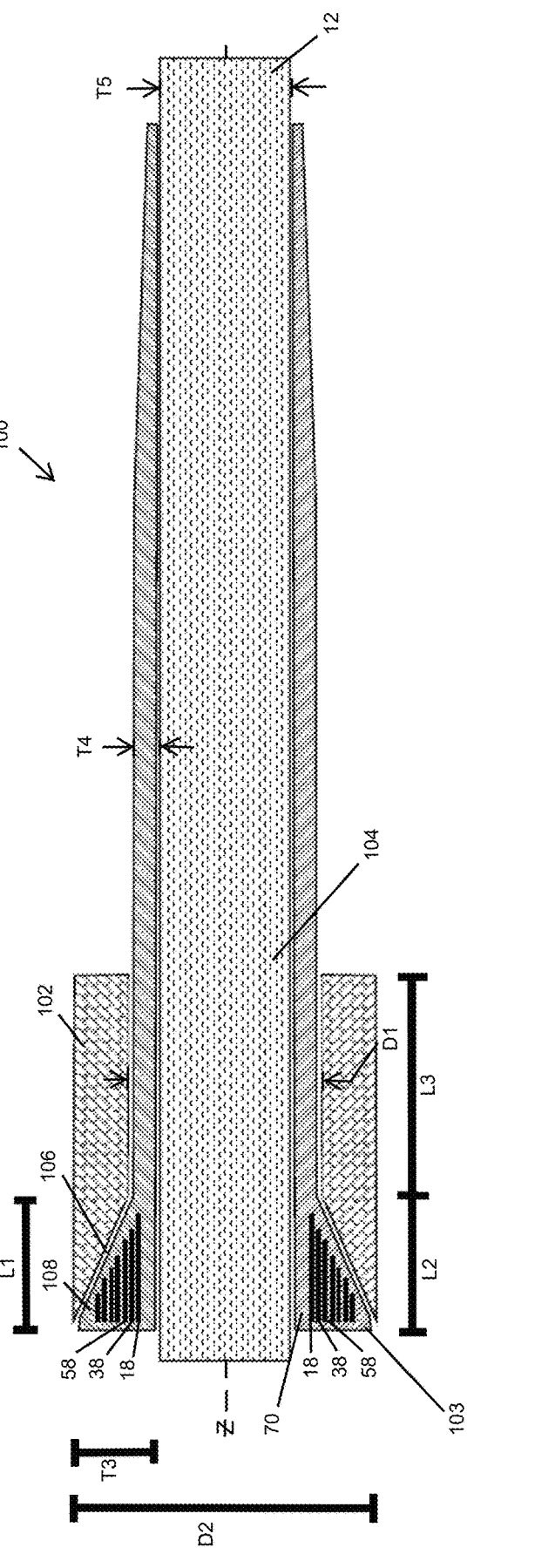
FIG. 6A shows a blade made from braided layers, the blade having a conical portion at one end.

In the manner described above in relation to FIGS. 1-5, multiple braids 11, 31, 51 etc. may be built up to form a multi-layer braided article 100 depicted in FIG. 6. Unlike FIGS. 1-5, FIG. 6 depicts the whole cross-section of the multi-layer braided article 100. The article may contain more than the three braids 11, 31, 51 previously described, and several more braids may be used to create the desired thickness and shape of the article 100. The braids 11, 31, 51 etc. may all be impregnated with a polymer or resin, using techniques known in the art, to form the multi-layer braided article 100 made of fibre-reinforced-composite (FRM).

The resin or polymer may be added to the braids after the braiding process. Alternatively or additionally, the tows making up the braid(s) and/or wrapper(s) may be pre-coated with the resin or polymer. Alternatively or additionally, one or more of the tows making up the braid may be a thermoplastic which, when the finished article is heated, melts and flows around the other (non-thermoplastic) tows to provide the required resin or polymer. Any of these techniques may be used, alone or in combination, to produce a fibre-reinforced-composite multi-layer braided article.

The article 100 may form part of a blade or propeller for an aircraft, as partially illustrated in FIG. 6. As such, the main body of the blade, not in the region containing the wrappers 18, 38, 58 etc. may be formed in an aerodynamic profile.

To form a blade, a sleeve 102 is slid onto the article 100 from a first end 101 of the article. As described in detail below, the sleeve may provide a convenient connection point to connect the braided part of the blade to another component, such as a hub. The sleeve 102 may be metallic. The sleeve 102 has a central opening 104 of varying diameter. It is known to connect blades to a hub at a root portion of the blade. In the present example, the sleeve 102 may provide a root portion of the blade.

In a first portion of the sleeve 102, along a length L3, the central opening 104 may have a cylindrical profile having a constant diameter D1 that is just sufficient to fit over the main body of the article 100. In the example show, the main body of the article has a wall thickness designated T4 and the core 12 has a thickness designated T5, and therefore the diameter D1 is equal to or slightly greater than T5+(2×T4). An interference fit may be formed such that, along length L3, the sleeve 102 squeezes against the article 100. This may provide at least part of a load path between the braided article 100 and a component (e.g. hub) to which the sleeve 102 is attached.

In a second portion of the sleeve 102, the diameter of the central opening 104 increases steadily, along a length L2, from the first diameter D1 to a second, greater, diameter D2. As such, the sleeve 102 has a generally conical internal space in the second portion, the conical space defined by a conical surface 106 of the sleeve 102.

In an alternative, not shown, the first portion along length L3 may have a conical profile, instead of a cylindrical profile, where the conical profile has a much lower conical angle than the conical surface 106 extending along length L2.

The braids 11, 31, 51 etc. have been laid up, as described above, so as to form a generally conical portion 70 at a second end 103 of the article 100 opposite the first end 101 of the article 100. That is, the conical portion 70 is a portion of the article 100 having a rapidly increasing wall-thickness. The conical portion 70 extends, starting at its widest point, from the second end 103 towards the first end. That is, the conical portion 70 points towards the first end 101 of the article 100, i.e. towards the blade tip when the article 100 is a blade. At the second end 103, the total wall thickness of the braids 11, 31, 51 etc. is designated T3 and thus the total diameter of the article 100 at the second end is equal to T5+(2×T3). This total diameter of the article 100 may be equal to the largest diameter, D2, of the central opening 104 of the sleeve.

The outer surface of the conical portion 70 is indicated by reference numeral 108 and generally corresponds to the conical surface 106 of the sleeve 102.

The sleeve 102 is slid along the article 100 until the conical surface 106 of the sleeve 102 abuts the conical outer surface 108 of the article 100. Due to the abutment with the conical portion 70, the sleeve 102 cannot move further along the article 100 in this direction. This abutment may provide another part of a load path between the braided article 100 and a component (e.g. hub) to which the sleeve 102 is attached.

The conical portion 70 provides (part of) a connection between the article 100 and the sleeve 102 that can resist substantial axial forces directed from the second end 103 towards the first end 101. Thus, for example, when the article 100 is a blade and the sleeve is metallic, the conical portion 70 provides a strong connection between the FRC of the blade and the metallic sleeve 102. The metallic sleeve 102 may be used to connect the blade to a hub and the sleeve 102 may have holes or other complex geometry on its radially outer surface (i.e. away from the article 100) allowing it to connect to the hub. A propeller may have several blades 100 made according to the present disclosure, each blade having a metallic sleeve 102 to provide the connection between the airfoil-shaped portion of the article 100 and the hub of the propeller.

The connection between the multi-layer braided article (blade) and the metal sleeve is a safety critical connection in an aircraft. An airfoil detachment during flight can lead to loss of aircraft and loss of life. G-loads and bending moments are generated by the airfoil portion of the blade, and are transmitted to the sleeve which may be formed to have ball bearing or roller bearing races at its outer diameter, in use. These bearings may transmit the loads to the hub of the propeller as the sole load transmission path.

The conical portion 70 acts to lock the multi-layer braided article to the sleeve in a manner that can react very high G-forces. The braid fibres of the conical portion provide good strength in this connection as they are not interrupted, i.e. cut, but instead wrap around the wrappers 18, 38 etc. As such, G-loads are transmitted via tension load/stresses along the braid fibres rather than via interlaminar shear between plies of fibres.

The conical portion 70 and adjacent region of the blade abutting the sleeve 102 may be shaped and sized for a corresponding design of the sleeve 102. This may ensure a strong connection between blade and sleeve 102.

Figure 6B:
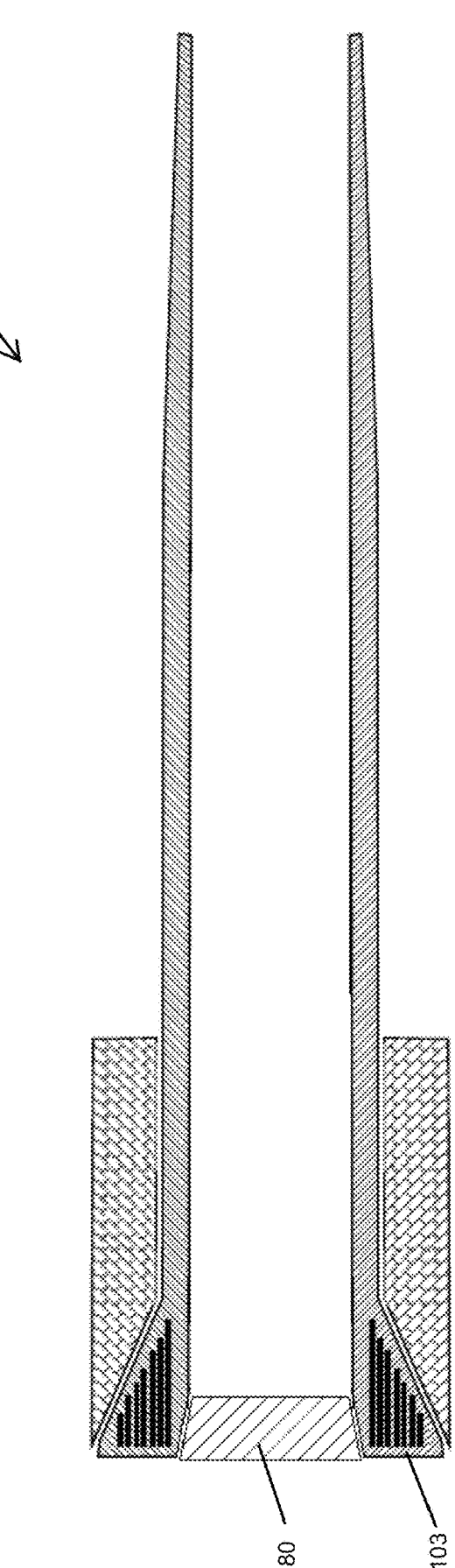
FIG. 6B shows a blade made from braided layers having a plug.

In the example shown in FIG. 6B, the core 12 has been removed and a plug 80 is pressed into the aperture of the conical portion 70 that was previously occupied by the core 12. This may provide further positive interlocking between the multi-layer braided article 100 and the sleeve 102. The plug 80 may help prevent collapsing of the conical portion 70 under loading, for example in blades where the core 12 has been removed. The plug 80 may also squeeze the conical portion 70 between the conical surface 106 of the sleeve 102 and the plug 80. The plug 80 may be trapezoidal as shown in FIG. 6B although other shapes are contemplated. A trapezoidal shape may assist in inserting the plug 80 into the aperture. The presence of the plug 80 may increase the conical angle of the conical portion 70. The sleeve 102 may have a conical surface 106 having a conical angle that matches the conical angle of the conical portion 70 after the plug 80 has been inserted.

The plug 80 may, for example, be made of metal or composite material. In some arrangements, such as those where there is no bonding (e.g. adhesive) between the sleeve 102 and the multi-layer braided article 100, the primary load path may be provided by the mechanical locking between the conical portion and the conical surface 106 of the sleeve.

In other arrangements where the multi-layer braided article is bonded to the sleeve 102, the conical portion 70 may provide a secondary (or 'failsafe') load path. In this arrangement, the conical portion 70 does not transmit a significant amount of load as long as the bonding joint between the sleeve 102 and the blade is healthy. In case of bond joint failure, the conical portion 70 will act to react the load and prevent loss of the blade.

In some arrangements, in the event of bond joint failure, the blade may rotate in the sleeve because of the twisting moment from the airfoil portion of the blade. This shift of pitch angle is not as unsafe as the loss of an airfoil. Further, this rotation may provide failure indication in the form of aeroimbalance created by the blade pitch change.

Figure 7:
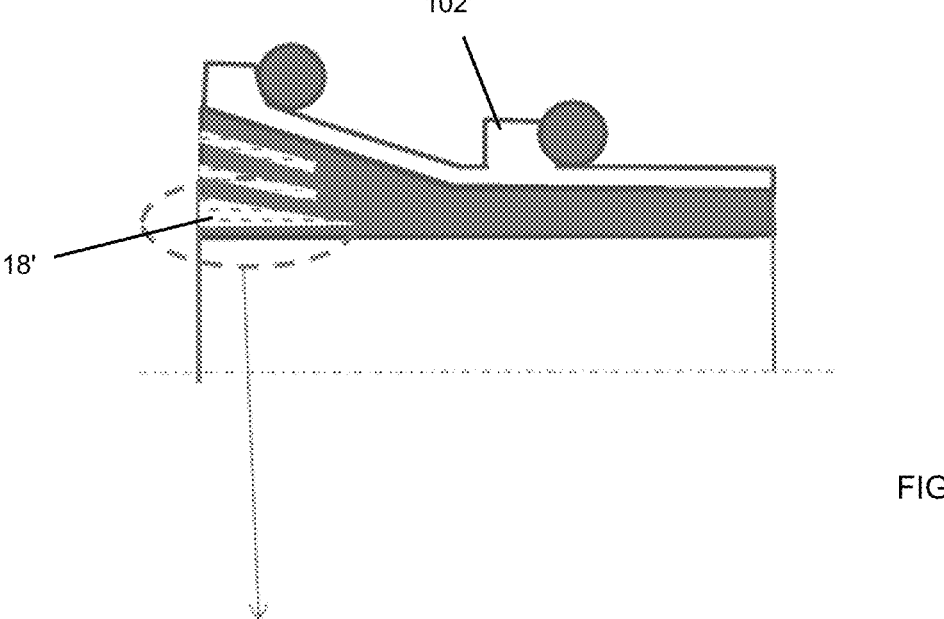
FIG. 7 shows a metallic sleeve abutting a conical portion of a multi-layer braided article.

FIG. 7 shows some further detail of the narrower end of the conical portion 70. In this figure, an alternative design of sleeve, sleeve 102', is depicted. The wrapper 18' is similar to the wrapper 18 described in relation to FIGS. 1-5. In FIGS. 1-5, the wrapper 18 is schematically depicted having a constant cross-sectional thickness along its axial length. In the wrapper 18' shown in FIG. 7, the wrapper has a non-constant thickness along its axial length. Compared to the wrapper 18 of FIGS. 1-5, this wrapper 18' provides a more gradual change of thickness as the second layer 22 passes from abutting the wrapper 18' to abutting the first layer 10. That is, the wrapper 18' smooths out the transition region 23 compared to the constant-thickness wrapper 18 depicted in FIGS. 1-5.

Figure 8:
FIG. 8 shows a cross-section of a single braid of the multi-layer braided article.

In one example, the variable thickness of the wrapper 18' may be provided by providing multiple layers of tows near the edge 18a and reducing the number of layers of tows towards the opposite end 18b. Alternatively, the variable thickness of the wrapper 18' may be provided by folding a fabric over itself such that some axial length of the wrapper 18' is double-layered (or more) while some axial length is single layered. FIG. 8 depicts the first braid 11 having a variable-thickness wrapper 18' between the first and second 10, 22 layers.

Figure 9:
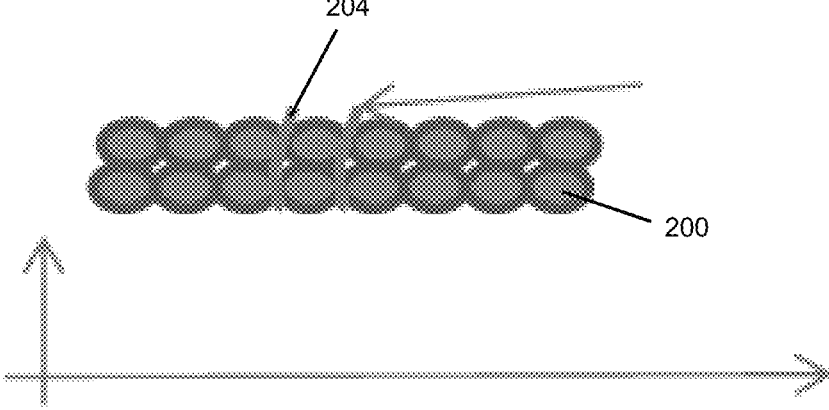
FIG. 9 shows a cross-section of a wrapper formed of unidirectional tows of fibre.
Figure 10:
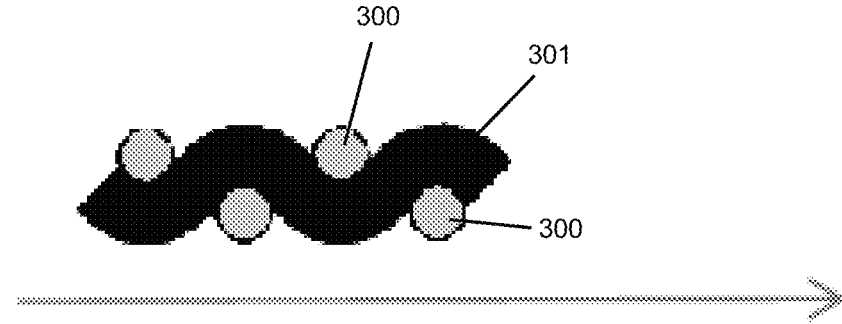
FIG. 10 shows a cross-section of a wrapper formed of a fabric.

FIGS. 9 and 10 depict cross-sections of two different types of wrappers that may be usable in any of the other embodiments described herein. FIG. 9 depicts two layers of unidirectional tows 200. The region between tows 204 can be susceptible to crack initiation. FIG. 10 depicts a woven fabric comprising tows 300 interwoven with tows 301 extending perpendicular to the first tows 300.

The conical angle of the conical section 70 may be determined by selection of the axial lengths of the wrappers 18, 38, 58 etc., and by selection the thicknesses thereof. A wide variety of conical angles are therefore available, as required for a given application.

While the apparatus and methods of the subject disclosure have been shown and described with reference to embodiments, those skilled in the art will readily appreciate that changes and/or modifications may be made thereto without departing from the scope of the disclosure as defined by the claims.

The invention claimed is:

1. A method of forming a multi-layer braided article, the method comprising:
   braiding over a core extending along a first axis (z), wherein the braid is wound circumferentially around the core and extending along the first axis, wherein the braid is folded back over itself to form a first layer and a second layer each extending along the first axis;
   laying a first wrapper over the first layer of the braid and extending circumferentially around the first axis, wherein the wrapper defines an edge of the first layer about which the braid is folded back along the first axis to form the second layer;
   wherein the edge is a first edge and the wrapper is a first wrapper, wherein the first wrapper extends a first axial length from the first edge;
   braiding a second braid on top of the first braid such that the second braid extends along the first axis, wherein the second braid is folded back over itself to form a first layer and a second layer extending along the first axis; and
   laying a second wrapper over the first layer of the second braid, wherein the second wrapper extends circumferentially around the second braid around the first axis;

wherein the second wrapper defines a second edge, that is located at the same axial location as the first edge, about which the second braid is folded back along the first axis to form the second layer of the second braid;
   wherein the second wrapper extends a second axial length that is less than the first axial length; and
   wherein the first layer of the second braid extends from the second edge by a length that is greater than the first axial length, such that the first and second braids form a conical portion of the multi-layer braided article.

2. The method according to claim 1, wherein the wrapper comprises one or more unidirectional tows wrapped circumferentially around the first layer and/or wherein the wrapper comprises a fabric wrapped circumferentially around the first layer.

3. The method according to claim 1, wherein the wrapper provides hoop tension around the first layer of braid to fix the edge in position along the first axis.

4. The method according to claim 1, wherein the braid is formed from high strength fibres suitable for aeronautical applications.

5. The method according to claim 1, wherein the braid is a uniaxial braid, a bi-axial braid, a tri-axial braid, or an interlock braid.

6. The method according to claim 1, further comprising a plug inserted into a central aperture of the conical portion.

7. The method according to claim 1, further comprising:
   providing a through-thickness reinforcement such that it penetrates at least two layers of braid at a location other than an edge about which the braid folds over itself;
   wherein the through-thickness reinforcement is configured to provide delamination resistance for the multi-layer braided article.

8. The method according to claim 1, further comprising:
   applying blind stitches in the second layer of the first braid, or in any subsequent layer of braid, to secure the second, or subsequent, layer to a layer of braid beneath.

9. A method of forming an aircraft blade, the method comprising:
   forming a multi-layer braided article according to the method of claim 1, wherein the braids have been formed into a fibre-reinforced composite multi-layer braided article, and
   providing a sleeve having an inner diameter over the article such that the sleeve extends around the fibre-reinforced composite multi-layer braided article and abuts the conical portion, wherein the inner diameter is smaller than an outer diameter of the conical portion such that the sleeve cannot move along the fibre-reinforced-composite multi-layer braided article past the conical portion.

10. A method of making a multi-layer braided article, the method comprising the steps of:
   braiding a first braided layer over a core by braiding in a first axial direction along the core;
   wrapping a wrapper circumferentially around the first braided layer to define an edge of the first braided layer; and
   continuing the braiding in a second direction, opposite the first direction, along the core to form a second braided layer over the first layer;
   wherein the wrapper maintains tension in the first layer during the braiding in the second direction.

11. The method of claim 10, wherein the wrapper is a first wrapper, wherein the edge of the first layer is a first edge, wherein the first wrapper extends a first axial length along the core from the first edge, and wherein the first and second layers are, respectively, first and second layers of a first braid, the method comprising:

braiding, in the first axial direction, a first layer of a second braid on top of the first braid, such that the first layer of the second braid extends for an axial distance greater than the first axial length;

wrapping a second wrapper circumferentially around the first layer of the second braid to define a second edge, wherein the second edge is at the same axial location along the core as the first edge;

wherein the second wrapper extends a second axial distance along the core wherein the second axial distance is less than the first axial distance; and continuing the braiding of the second braid in the second axial direction to form a second layer of the second braid over the first layer of the second braid;

wherein the second wrapper maintains tension in the first layer of the second braid during the braiding in the second axial direction, wherein the first and second braids form a conical portion of the multi-layer braided article.

12. The method of claim 10, comprising:

braiding one or more further braids, in sequence, on top of the first and second braids, each further braid comprising: a first and second layer and a wrapper defining an edge of that braid's first layer;

wherein the edges of all of the braids' first layers are at the same axial position along the core, and wherein the wrapper of each further braid extends for a shorter axial length than the axial length of any of the wrappers located beneath that further braid, such that the plurality of braids form a conical portion of the multi-layer braided article.

13. The method of claim 10, wherein the steps are performed in order make the multi-layer braided article having a conical portion and then, in any order:

removing the core and optionally inserting a plug in an aperture of the conical portion;

forming a fibre-reinforced composite multi-layer braided article from the multi-layer braided article; and placing a sleeve around the multilayer braided article, wherein the metallic sleeve has a conical portion that abuts the conical portion of the multi-layer braided article such that the conical portion prevents axial movement of the metallic sleeve past the conical portion, so as to form the propeller blade.

\* \* \* \* \*